United States Patent
Shim et al.

(10) Patent No.: US 9,181,747 B2
(45) Date of Patent: Nov. 10, 2015

(54) DOOR FOR HOME APPLIANCE AND METHOD FOR MANUFACTURING THE SAME

(71) Applicant: LG ELECTRONICS INC., Seoul (KR)

(72) Inventors: Jinwoo Shim, Changwon-si (KR); Byeongkyun Seo, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/906,398

(22) Filed: May 31, 2013

(65) Prior Publication Data

US 2013/0323461 A1 Dec. 5, 2013

(30) Foreign Application Priority Data

Jun. 1, 2012 (KR) ........................ 10-2012-0059076

(51) Int. Cl.
| | |
|---|---|
| A47B 97/00 | (2006.01) |
| E06B 3/70 | (2006.01) |
| F25D 23/02 | (2006.01) |
| B32B 3/04 | (2006.01) |
| B32B 27/30 | (2006.01) |
| B29C 49/10 | (2006.01) |

(52) U.S. Cl.
CPC ................ E06B 3/7001 (2013.01); B32B 3/04 (2013.01); B32B 27/308 (2013.01); F25D 23/02 (2013.01); *B29C 49/10* (2013.01); *B29C 2791/006* (2013.01); *B29C 2795/002* (2013.01); *Y10T 428/2419* (2015.01)

(58) Field of Classification Search
CPC .......... E06B 3/7001; E06B 2003/7013; E06B 2003/7051; B32B 3/04; B32B 27/308
USPC ............................................ 312/204, 405, 228
See application file for complete search history.

(56) References Cited

U.S. PATENT DOCUMENTS

| | | | | |
|---|---|---|---|---|
| 4,307,058 | A * | 12/1981 | Morello et al. | 264/510 |
| 4,350,550 | A * | 9/1982 | Van Manen | 156/237 |
| 5,252,360 | A * | 10/1993 | Huttl et al. | 427/249.17 |
| 5,352,532 | A * | 10/1994 | Kline | 428/447 |
| 5,533,311 | A * | 7/1996 | Tirrell et al. | 52/309.9 |
| 6,325,607 | B1 * | 12/2001 | Atake | 425/122 |
| 6,935,712 | B2 * | 8/2005 | Reed et al. | 312/405 |
| 8,336,974 | B2 * | 12/2012 | Lee et al. | 312/405 |

(Continued)

FOREIGN PATENT DOCUMENTS

| | | |
|---|---|---|
| JP | 46-001895 | 10/1971 |
| JP | 63-197625 | 8/1988 |

(Continued)

OTHER PUBLICATIONS

Japanese Office Action issued in related Application No. 2013-116958 dated Mar. 20, 2014.

(Continued)

*Primary Examiner* — Hanh V Tran
(74) *Attorney, Agent, or Firm* — KED & Associates, LLP

(57) ABSTRACT

A door including a decorative panel is provided. The door may include a door liner, an outer door connected to the door liner, an insulation material disposed between the door liner and the outer door, and a decorative panel provided on an outer surface of the outer door. The decorative panel may include a front surface and a side surface extending at a bend from the front surface. The door may be coupled to a refrigerator or other home appliance.

15 Claims, 10 Drawing Sheets

(56) References Cited

U.S. PATENT DOCUMENTS

| | | | |
|---|---|---|---|
| 8,439,461 B2* | 5/2013 | Kim | 312/405 |
| 8,827,389 B2* | 9/2014 | Lee et al. | 312/405 |
| 2005/0104487 A1* | 5/2005 | Mangano | 312/228 |
| 2005/0212181 A1* | 9/2005 | Evans et al. | 264/485 |
| 2006/0147655 A1* | 7/2006 | Schober | 428/13 |
| 2006/0196879 A1* | 9/2006 | Chochinov et al. | 220/665 |
| 2007/0063983 A1* | 3/2007 | Huang et al. | 345/173 |
| 2008/0085415 A1* | 4/2008 | Li et al. | 428/412 |
| 2009/0202796 A1* | 8/2009 | Koo et al. | 428/209 |
| 2009/0249824 A1* | 10/2009 | Koo | 62/449 |
| 2010/0109494 A1* | 5/2010 | Jung | 312/228 |
| 2010/0180627 A1 | 7/2010 | Hanke | |
| 2011/0001403 A1* | 1/2011 | Chang et al. | 312/204 |

FOREIGN PATENT DOCUMENTS

| | | |
|---|---|---|
| JP | 63-308023 | 12/1988 |
| JP | H 05-280858 A | 10/1993 |
| JP | 2004-116788 A | 4/2004 |
| JP | 2004-278891 | 10/2004 |
| JP | 2004-361066 A | 12/2004 |
| JP | 2005-140408 | 6/2005 |
| JP | 2007-114305 | 5/2007 |
| JP | 2007-120795 | 5/2007 |
| WO | WO 2007/049439 A1 | 5/2007 |

OTHER PUBLICATIONS

Japanese Office Action issued in Application No. 2013-116958 dated Mar. 12, 2015.

Chinese Office Action issued in Application No. 201310206472.8 dated Mar. 20, 2015.

Japanese Office Action dated Sep. 8, 2015 issued in Application No. 2013-116958.

* cited by examiner

DOOR FOR HOME APPLIANCE AND METHOD FOR MANUFACTURING THE SAME

CROSS-REFERENCE TO RELATED APPLICATION(S)

This application claims priority under 35 U.S.C. §119 to Korean Application No. 10-2012-0059076 filed on Jun. 1, 2012, whose entire disclosure is hereby incorporated by reference.

BACKGROUND

1. Field

This relates to a door, and in particular a door for a refrigerator or other home appliance and a method for manufacturing the same.

2. Background

In general, refrigerators store items at a low temperature. Refrigerators, as well as other home appliances, may include various exterior finishes to improve an external appearance thereof.

BRIEF DESCRIPTION OF THE DRAWINGS

The embodiments will be described in detail with reference to the following drawings in which like reference numerals refer to like elements wherein.

DETAILED DESCRIPTION

Figure 1:
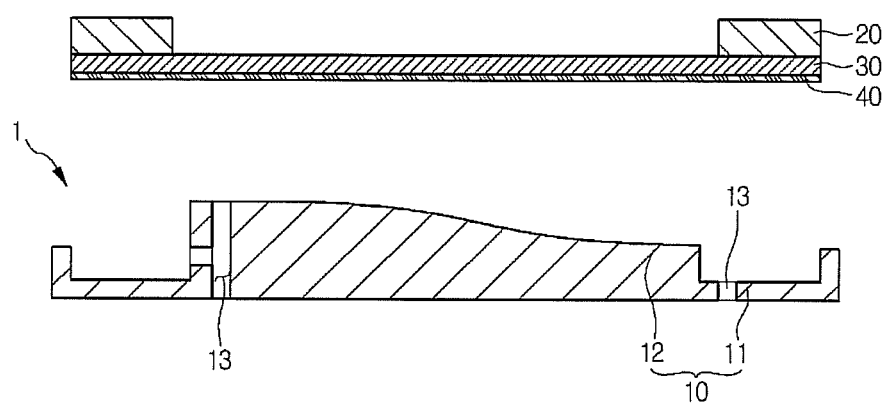
FIG. 1 is a sectional view of an apparatus for molding a transparent synthetic resin panel according to an embodiment as broadly described herein.
Figure 2:
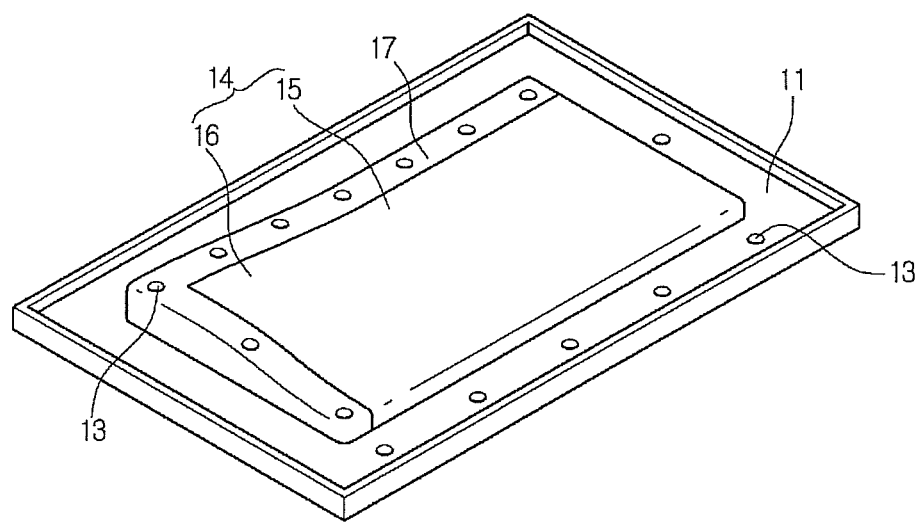
FIG. 2 is a perspective view of a mold including the molding apparatus shown in FIG. 1.

Reference will now be made in detail to various embodiments, examples of which are illustrated in the accompanying drawings. In the following detailed description, reference is made to the accompanying drawings that form a part hereof, and in which is shown by way of illustration various embodiments. These embodiments are described in sufficient detail to enable those skilled in the art, and it is understood that other embodiments may be utilized and that logical structural, mechanical, electrical, and chemical changes may be made without departing from the spirit or scope as broadly described herein. To avoid unnecessary detail, the description may omit certain information understood by those skilled in the art. The following detailed description is, therefore, not to be taken in a limiting sense. Wherever possible, like reference numerals will denote like elements even though the elements are displayed in different drawings.

Figure 10:
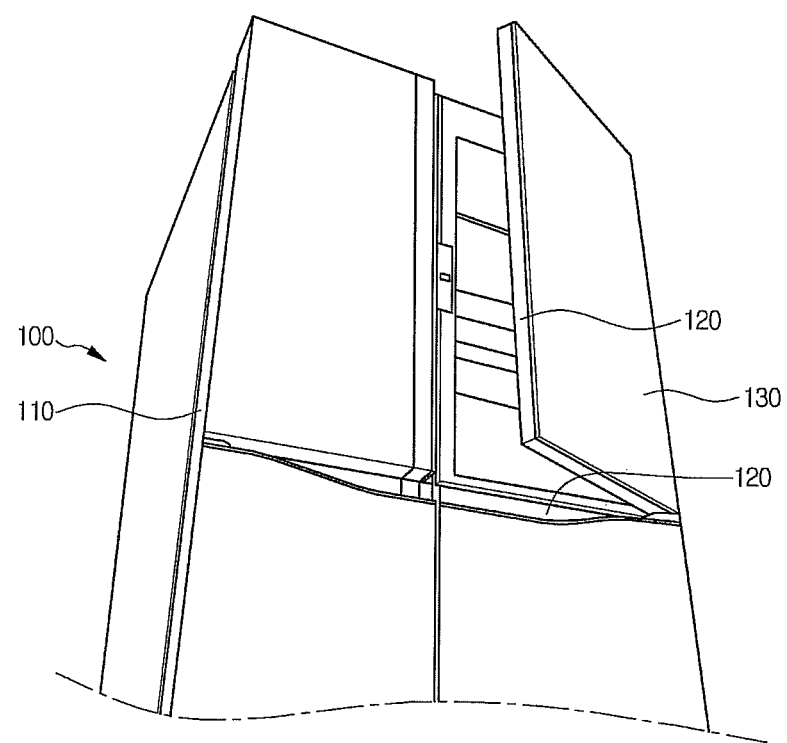
FIG. 10 is a perspective view of an exemplary refrigerator.

FIG. 10 is a perspective view of an exemplary refrigerator 100 including a main body having a storage chamber therein and a refrigerator door 110 connected to the main body to open or close the storage chamber. The refrigerator door 110 may be provided in plurality, and may include a home bar door 120 providing access to a home bar storage area.

A decorative panel 130 may be disposed on at least one of the refrigerator door 110 or the home bar door 120. Tempered glass may be used to form the decorative panel 130 of the refrigerator door 110. However, tempered glass may be somewhat heavy and expensive when compared to a panel formed of a different material. In addition, tempered glass may be broken by an impact, and may cause damage to a user. Replacement cost of the broken tempered glass may be relatively high. Thus, other materials may be considered for the decorative panel of the door.

Referring to FIGS. 1 to 4, a molding apparatus 1 according to an embodiment as broadly described herein may include a mold 10 for processing a transparent synthetic resin panel 30 in a predetermined shape and a holder 20 for holding the transparent synthetic resin panel 30.

In this embodiment, the molding apparatus 1 may mold the transparent synthetic resin panel 30 using a vacuum molding method (a vacuum thermal molding method). Other methods may also be appropriate.

The mold 10 may include a base part 11 and a mold part 12 protruding, or extending, from the base part 11. The transparent synthetic resin panel 30 may be molded in substantially the same shape as that of the mold part 12. The mold part 12 may include a first mold 14, and a second mold 17 disposed on two adjacent side surfaces of the first mold 14 and defining an edge portion of the first mold 14. The first mold 14 and the second mold 17 may be integral or provided as separate parts. In this embodiment, after the transparent synthetic resin panel 30 is molded, a portion of the transparent synthetic resin panel 30 corresponding to the first mold 14 may be used for application to an object (for example, a door for a refrigerator), and a portion of the transparent synthetic resin panel 30 corresponding to the second mold 17 may be removed.

The first mold 14 may include a planar section 15 and a non-planar section 16 (or a protrusion or extension from the planar section 15). For example, although the non-planar section 16 may be disposed on one corner of the first mold 14, the present disclosure is not limited to this position. The non-planar section 16 may be rounded to improve an aesthetic quality when the non-planar section 16 is applied to a target object. For example, a protruding height of the non-planar section 16 from the base part 11 may be greater than that of the planar section 15 from the base part 11. As a result, the transparent synthetic resin panel 30 may have a three-dimensional shape or contour defined by the planar section 15 and the non-planar section 16.

At least one exhaust hole 13 may be defined in the edge of the mold part 12, i.e., the second mold 17. Also, at least one exhaust hole 13 may be defined in the base part 11. Since air between the transparent synthetic resin panel 30 and the mold 10 is exhausted through the exhaust hole 13 when the transparent synthetic resin panel 30 is thermally vacuum-molded, the transparent synthetic resin panel 30 may be closely attached to the mold 10. Thus, the transparent synthetic resin panel 30 may be molded in a specific shape or contour (substantially the same shape or contour as that of the mold part 12).

The transparent synthetic resin panel 30 may be, for example, an acrylic material. For example, the transparent synthetic resin panel 30 may be a casting poly methyl methacrylate (PMMA) sheet for molding.

When the transparent synthetic resin panel 30 is molded and used as, for example, a decorative panel such as for the door for a refrigerator or other home appliance, an exposed surface of the transparent synthetic resin panel 30 may be easily damaged during use or scratched when compared to a tempered glass panel. Thus, in the current embodiment, a coating layer for improving surface hardness may be provided on one surface or both surfaces of the transparent synthetic resin panel 30.

The coating layer may be formed by applying or spraying a coating solution on the transparent synthetic resin panel 30.

In certain embodiments, such a coating solution may contain about 25 wt % to about 30 wt % of acrylate oligomer, about 15 wt % to about 20 wt % of polyester acrylate, about 15 wt % of urethane acrylate, about 10 wt % to about 15 wt % of polyester adhesion promoter, about 15 wt % of silica sol, and about 10 wt % of other components.

Thus, the coating layer may be disposed on the transparent synthetic resin panel 30 to increase surface hardness, thereby minimizing surface damage.

Alternatively, a coating sheet including the coating solution may be attached to the transparent synthetic resin panel 30.

For example, when the transparent synthetic resin panel 30 is also to be used as a decorative panel, a printed layer 40 may be disposed on one surface of the transparent synthetic resin panel 30 to improve an external appearance of the door. In this embodiment, the coating layer may be disposed on at least one surface (a top surface of the transparent synthetic resin panel 30 shown in FIG. 1) of the transparent synthetic resin panel 30, and the printed layer 40 may be disposed on at least one surface (a bottom surface of the transparent synthetic resin panel 30 shown in FIG. 1) facing the front surface of the transparent synthetic resin panel 30. Also, when the transparent synthetic resin panel 30 is used as a decorative panel, the front surface may define an outer surface.

The printed layer 40 may be formed by attaching a printed sheet to the transparent synthetic resin panel 30 or by applying or spraying a printing solution on the transparent synthetic resin panel 30. The printed layer 40 may have various patterns and/or shapes.

In the current embodiment, the printed layer 40 may be thermally vacuum-molded together with the transparent synthetic resin panel 30 after the transparent synthetic resin panel 30 is molded. When the printed layer 40 is thermally vacuum-molded, the original pattern of the printed layer 40 may be distorted or deformed by the three-dimensional shape of the mold part 12. Thus, the printed layer 40 may be designed to correspond to the deformation of the shape (or pattern) due to the three-dimensional processing of the transparent synthetic resin panel 30.

Figure 3:
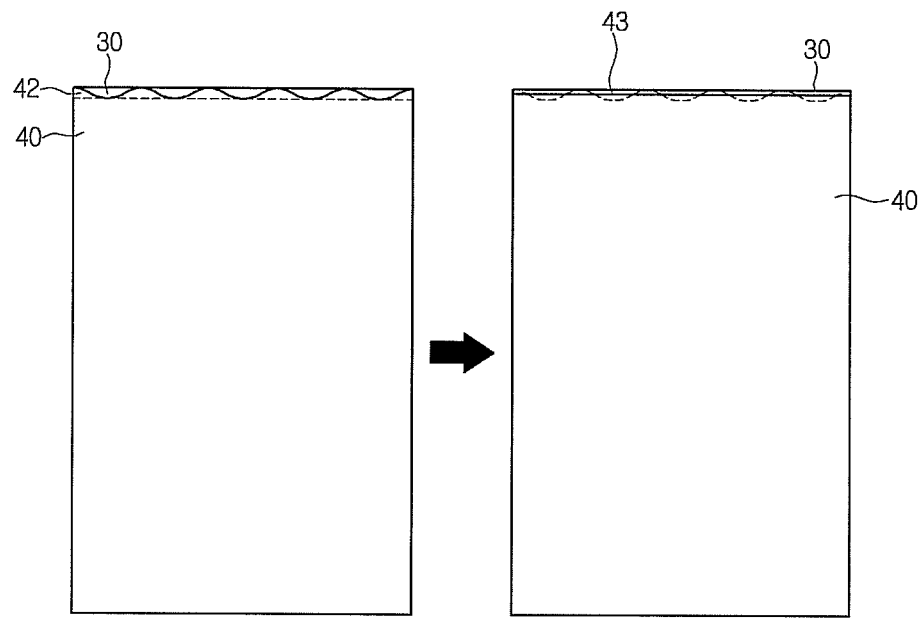
FIG. 3 illustrates formation of a printed layer on a transparent synthetic resin panel.

For example, referring to FIG. 3, a portion of the printed layer 40 may be patterned. That is, the printed layer 40 may include a pattern design part 42. The pattern may be positioned corresponding to the planar section 15 of the first mold 14, or to the non-planar section 16, or to both sections 15 and 16. For example, the pattern design part 42 may be disposed along an edge of the printed layer 40 as shown in FIG. 3. Also, the pattern design part 42 may have, for example, a wave shape as shown in FIG. 3, or other shape as appropriate. The distortion and deformation of the pattern shape may occur due to the change in shape of the panel 30 due to thermal vacuum molding, by a stretched length difference of the printed layer 40 when the printed layer 40 is thermally molded. Thus, the pattern may be designed on the printed layer 40 to account for the anticipated deformation, and to maintain an intended finished shape or appearance.

For example, FIG. 3 illustrates at the left the printed layer 40 before being vacuum-molded, and at the right the printed layer 40 after being vacuum-molded. As shown in FIG. 3, after being vacuum-molded, the pattern design part 42 may be substantially deformed (see reference numeral 43), for example, stretched, resulting in a length and/or appearance difference of the pattern design part 42.

Figure 5:
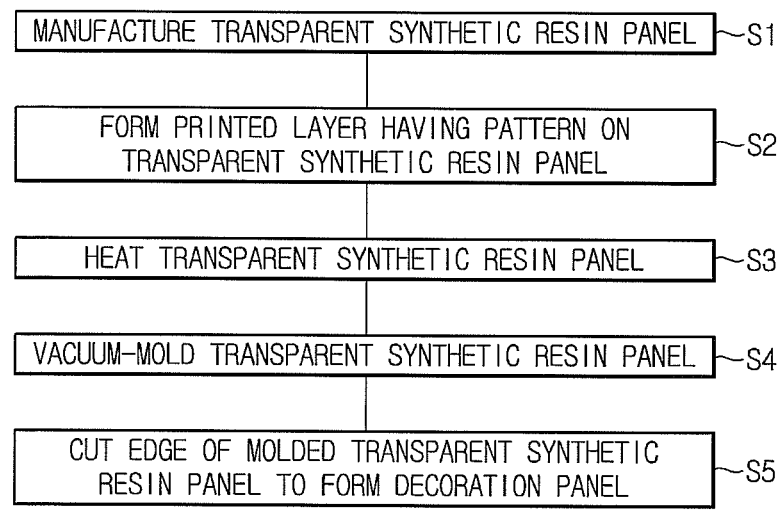
FIG. 5 is a flowchart of a method for molding the transparent synthetic resin panel.
Figure 6:
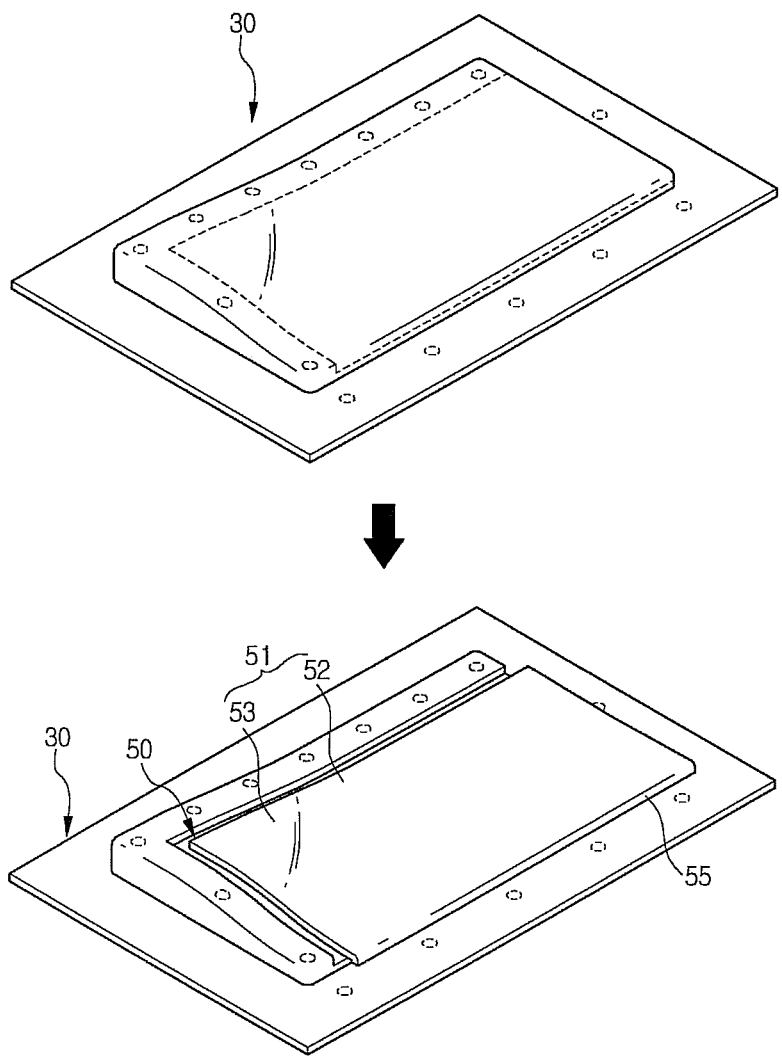
FIG. 6 illustrates a method for processing the vacuum-molded transparent synthetic resin panel into a decorative panel.

FIG. 5 is a flowchart of a method for molding a transparent synthetic resin panel, and FIG. 6 illustrates processing of the vacuum-molded transparent synthetic resin panel into a decoration panel.

Figure 4:
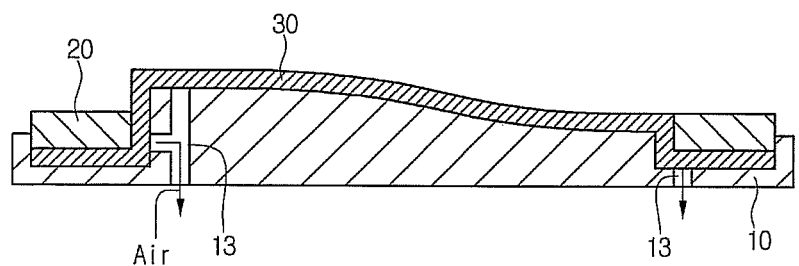
FIG. 4 is a sectional view of the molding apparatus shown in FIGS. 1 and 2 during a process in which the transparent synthetic resin panel is vacuum-molded.

Referring to FIGS. 4 to 6, the first transparent synthetic resin panel 30 including the coating layer as described above is prepared (S1).

Then, the printed layer 40 including a pattern is formed on the transparent synthetic resin panel 30 (S2).

Then, the transparent synthetic resin panel 30 on which the printed layer 40 is formed is heated (S3). The heating of the transparent synthetic resin panel 30 may be performed before or after the transparent synthetic resin panel 30 is fixed to the holder 20.

Then, the heated transparent synthetic resin panel 30 is thermally vacuum-molded. Particularly, the transparent synthetic resin panel 30 may approach the mold 10 in a state in which the printed layer 40 faces the mold 10.

Air between the transparent synthetic resin panel 30 and the mold 10 may be exhausted through the one or more exhaust holes 13 while the transparent synthetic resin panel 30 approaches the mold 10. The transparent synthetic resin panel 30 may be seated on the mold 10 and then vacuum-molded, so that the transparent synthetic resin panel 30 is closely attached to the mold 10, and is molded in substantially the same shape as that of the mold part 12 of the mold 10 (S4).

Referring to FIG. 6, after the transparent synthetic resin panel 30 is molded, a portion of the transparent synthetic resin panel 30 may have the same shape as that of the mold part 12, and the remaining portion of the transparent synthetic resin panel 30 may have the same shape as that of the base part 11.

Pock marks having a shape corresponding to that of the exhaust holes 13 may be formed in the transparent synthetic resin panel 30 as it is vacuum-molded because portions of the transparent synthetic resin panel 30 corresponding to the exhaust holes 13 contact the exhaust holes 13 as air is exhausted therethrough. At least one pock mark may be formed in each of a portion corresponding to the second mold 17 of the transparent synthetic resin panel 30 and a portion corresponding to the base part 11.

As described above, since the portion of the transparent synthetic resin panel 30 corresponding to the first mold 14 is eventually used to form the decorative panel, edges of the transparent synthetic resin panel 30 may be cut to finish manufacture the decorative panel 50 (S5). The cut-out portion shown with dotted lines in FIG. 6 may include a portion corresponding to the base part 11 and a portion corresponding to the second mold 17. Thus, the pock marked portions are not included in the decorative panel 50 after the edges of the transparent synthetic resin panel 30 removed, so aesthetic appearance is maintained.

If the exhaust hole 13 were formed in the first mold 14 of the mold 10, a corresponding pock mark would be formed in the portion of the transparent synthetic resin panel 30 corresponding to the first mold 14 and decorative panel 50, thus detracting from the aesthetic appearance. However, since in this embodiment, the exhaust hole 13 is formed in the second mold 17, the portion in which the pock mark is formed is eventually removed, and aesthetic appearance may be maintained.

The decorative panel 50 manufactured by cutting the edges of the molded transparent synthetic resin panel 30 may include a first surface 51 and at least one second surface 55 extending and bent from the first surface 51. For example, two second surfaces 55 may be provided, and may be connected to each other. For example, when the decorative panel 50 is used as a door for a refrigerator, the first surface 51 may be a front surface of the door, and the second surface 55 may be a side surface of the door.

The first surface 51 may have substantially the same three-dimensional shape/contour as that of the first mold 14. That is, the first surface 51 may include a planar section 52 and non-planar section 53 (or protrusion). The non-planar section 53 may be defined on one corner of the first surface 51.

Figure 7:
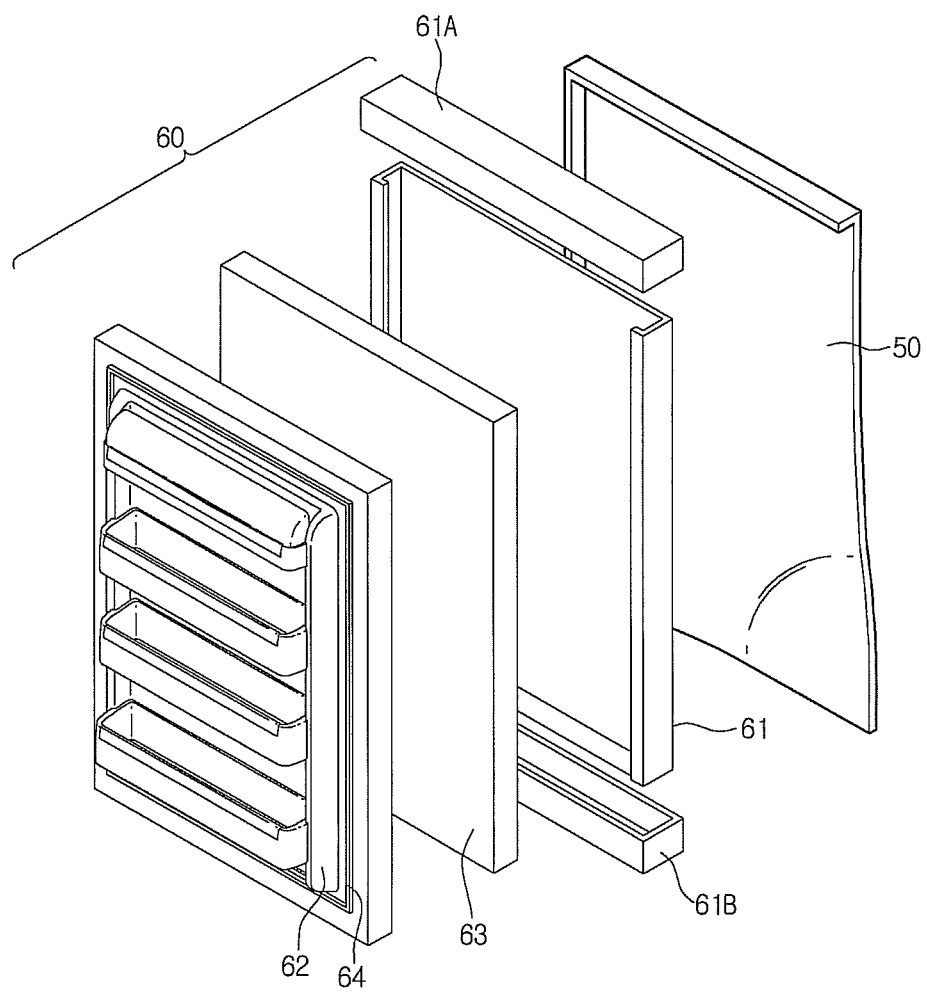
FIG. 7 is an exploded perspective view of a door for a refrigerator according to an embodiment as broadly described herein.

FIG. 7 is an exploded perspective view of a door for a refrigerator, according to an embodiment as broadly described herein.

As described above, a decorative panel may be manufactured by thermally vacuum-molding the transparent synthetic resin panel 30. Also, the decorative panel may be used for a door for a refrigerator. Alternatively, such a decorative panel may be used for doors of other home appliances, or other object to be decorated, as appropriate.

As shown in FIGS. 6 and 7, a door 60 of a refrigerator may include an outer door 61, a door liner 62, an insulation material 63 disposed between the outer door 61 and the door liner 62, and a decorative panel 50 coupled to the outer door 61. The door 60 may also include an upper cap 61A coupled to an upper portion of the outer door 61 and a lower cap 61B coupled to a lower portion of the outer door 61. The caps 61A and 61B may connect the door liner 62 to the outer door 61. Alternatively, the caps 61A and 61B may connect the decorative panel 50 to the door liner 62. Thus, to manufacture the door 60 of the refrigerator, the outer door 61, the door liner 62, the caps 61A and 61B, and the decorative panel 50 may be separately manufactured. A gasket 64 for preventing cool air from leaking may be disposed on the door liner 62.

In this embodiment, the decorative panel 50 may be manufactured using the method described in FIGS. 5 and 6. The outer door 61, the caps 61A and 61B, and the door liner 62 may be manufactured using other known methods, whose detailed manufacturing descriptions will be omitted.

Then, a foam agent may be injected into the outer door 61. After the injected foam agent is cured, the decorative panel 50 may be connected (or mounted) to an outer surface of the outer door 61 to complete manufacture of the door for the refrigerator. The cured foam agent serves as the insulation material 63 of the refrigerator door 60, and may be disposed in a space formed between the outer door 61 and the door liner 62. The foam agent may be injected before an outer circumferential surface of the door liner 62 is connected to a flange of the outer door 61, or may be injected into the space between the door liner 62 and the outer door 61 through a hole formed in the door liner 62 after the door liner 62 is connected to the flange of the outer door 61. The decorative panel 50 may be coupled to the outer door 61 after the foam agent is injected, or the foam agent may be injected into the outer door 61 after the decorative panel 50 is coupled to the outer door 61.

As described above, the decorative panel 50 may include a first surface 51 and at least one second surface 55. The first surface 51 may cover a front surface of the outer door 61, and the at least one second surface 55 may cover at least one of a side or top surface of the outer door 61.

According to the current embodiment, since a transparent synthetic resin panel is used for the decorative panel 50, the door may be relatively light in weight and have lower manufacturing costs. In addition, since the decorative panel 50 may have a three-dimensional shape/contour, an external appearance of the door may be improved.

Also, since a coating layer for improving surface hardness of the decorative panel 50 is formed on the decorative panel 50, surface damage of the decorative panel 50 may be minimized.

Figure 8:
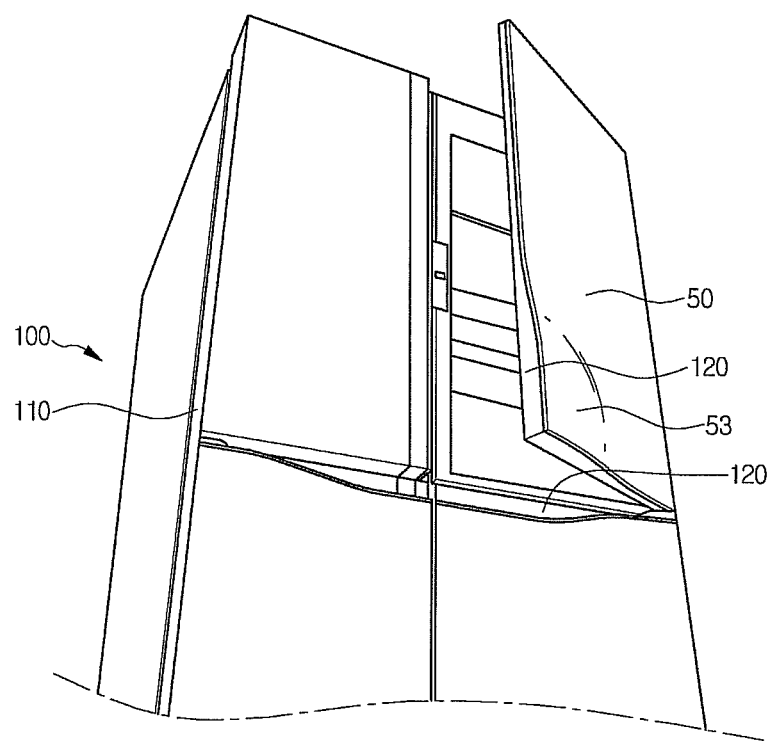
FIG. 8 is a perspective view of a refrigerator including a door, according to an embodiment as broadly described herein.

As shown in FIG. 8, the completely manufactured door may be installed on a refrigerator 100. Such a refrigerator door 110 may open and close a storage chamber of the refrigerator 100 and/or a home bar door 120 coupled to the door 110. The current embodiment is not limited to the refrigerator door arrangement shown in FIG. 8. Exterior appearance of the refrigerator 100 may be improved by the decorative panel, regardless of door arrangement.

Figure 9:
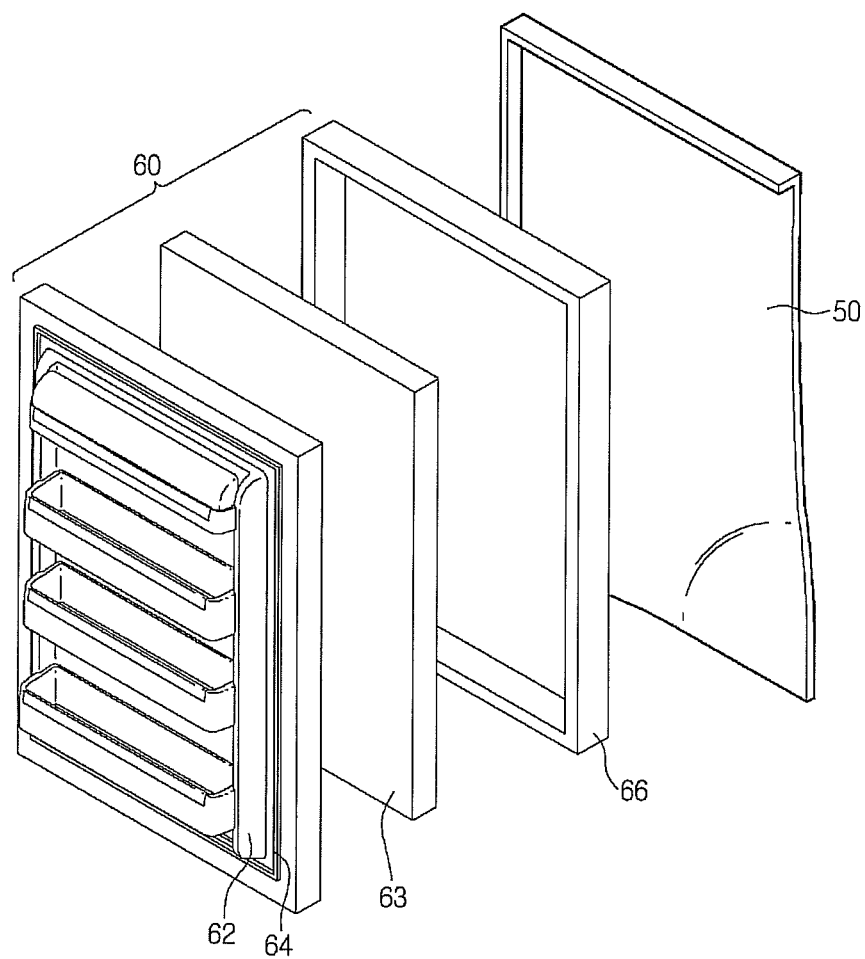
FIG. 9 is an exploded perspective view of a door for a refrigerator according to another embodiment as broadly described herein.

FIG. 9 is an exploded perspective view of a door according to another embodiment as broadly described herein.

The embodiment shown in FIG. 9 is similar to the embodiment shown in FIG. 7, except for some structural differences in the door. Thus, only specific portions will be described below.

Referring to FIG. 9, a decorative panel 50 may be disposed on a door 60 through the same method as that according to the foregoing embodiment. However, in the current embodiment, the decorative panel 50 may serve as an outer door. That is, the refrigerator door 60 may include the door liner 62, the decorative panel 50 (also serving as the outer door), and a frame 66 disposed between the door liner 62 and the decorative panel 50 (the outer door) to define a side surface of the door. An insulation material 63 may be disposed in a space defined by the door liner 62, the frame 66, and the decorative panel 50. That is, the insulation material 63 may contact a back surface of the decorative panel 50. As described in the foregoing embodiments, the decorative panel 50 (the outer door) may be formed of a transparent synthetic resin material, and may include a printed layer.

As described above with respect to the foregoing embodiments, since the decorative panel mounted on the outer surface of the outer door has the front surface and the side surface extending and bent from the front surface, a gap between the outer door and the decorative panel may be reduced/eliminated to prevent foreign substances from being introduced through the gap and improve a sense of unity of the outer door and the decorative panel.

Also, the front surface of the decorative panel or the outer door may have the three-dimensional shape/contour due to the planar and non-planar sections, to improve external appearance of the door.

Also, since the decorative panel or the outer door is formed by using the casting poly methyl methacrylate (PMMA) sheet for molding, the decorative panel or the outer door may have superior formability, a wide temperature range during molding, superior hot water resistance, and superior chemical resistance, and also, is not discolored when molded.

Also, since the coating layer is disposed on one surface of the decorative panel or the outer door, surface hardness may be increased to minimize surface damage.

Also, since any pock marks are disposed in the edge of the vacuum-molded transparent synthetic resin panel which is removed, external appearance of the door may be maintained.

Also, since the pattern of the printed layer has is designed to correspond to the deformation due to the three-dimensional processing of the transparent synthetic resin panel, the pattern of the printed layer may be maintained in an intended shape after the transparent synthetic resin panel is vacuum-molded.

Also, since the transparent synthetic resin is used in the decoration panel, the door may be relatively light in weight and reduced in manufacturing costs.

Embodiments provide a door for a refrigerator and a method for manufacturing the same, a decoration panel, and a method and apparatus for molding a transparent synthetic resin panel.

In one embodiment, a door for a refrigerator as broadly described herein may include a door liner; an outer door connected to the door liner; an insulation material disposed between the door liner and the outer door; and a decoration panel mounted on an outer surface of the outer door, the decoration panel having a front surface and a side surface extending and bent from the front surface.

In another embodiment, a door for a refrigerator in which an insulation material is disposed in a space defined by an outer door and a door liner is provided, wherein a decoration panel manufactured by vacuum-molding a transparent synthetic resin panel is mounted on an outer surface of the outer door.

In another embodiment, a door for a refrigerator as broadly described herein may include a decoration panel defining an outer appearance of the door, wherein the decoration panel is vacuum-molded in a state where a printed layer having a pattern is provided on an inner surface of the decoration panel.

In still another embodiment, a door for a refrigerator as broadly described herein may include a door liner; an outer door connected to the door liner; an insulation material disposed between the door liner and the outer door; and a decoration panel mounted on an outer surface of the outer door, the decoration panel being formed of a transparent synthetic resin material, wherein the transparent synthetic resin material comprises casting poly methyl methacrylate (PMMA) for molding.

In another embodiment, a method for manufacturing a door for a refrigerator as broadly described herein may include attaching a sheet on which a pattern is printed to a transparent synthetic resin panel; heating the transparent synthetic resin panel to seat the heated transparent synthetic resin panel on a mold in the state where the sheet is attached to the transparent synthetic resin panel; vacuum-molding the transparent synthetic resin panel seated on the mold; cutting an edge of the vacuum-molded transparent synthetic resin panel; and mounting the transparent synthetic resin panel of which the edge is cut on a front surface of the door for the refrigerator.

In yet another embodiment, a method for molding a transparent synthetic resin panel as broadly described herein may include forming a printed layer having a pattern on the transparent synthetic resin panel; heating the transparent synthetic resin panel to dispose the heated transparent synthetic resin panel on a mold in the state where the printed layer is formed on the transparent synthetic resin panel; and vacuum-molding the transparent synthetic resin panel disposed on the mold.

In another embodiment, a method for vacuum-molding a transparent synthetic resin panel so that at least one portion of the transparent synthetic resin panel has a three-dimensional shape as broadly described herein may include attaching a sheet on which a pattern is printed to the transparent synthetic resin panel; heating the transparent synthetic resin panel to seat the heated transparent synthetic resin panel on a mold having an exhaust hole corresponding to an edge of the transparent synthetic resin panel in the state where the sheet is attached to the transparent synthetic resin panel; vacuum-molding the transparent synthetic resin panel seated on the mold; and cutting an edge of a portion of the vacuum-molded transparent synthetic resin panel corresponding to the exhaust hole.

In further another embodiment, a method for vacuum-molding a transparent synthetic resin panel so that at least one portion of the transparent synthetic resin panel has a three-dimensional shape as broadly described herein may include attaching a sheet on which a pattern designed to correspond to a pattern deformed by three-dimensionally processing the transparent synthetic resin panel is printed to the transparent synthetic resin panel; heating the transparent synthetic resin panel in the state where the sheet is attached to the transparent synthetic resin panel; and vacuum-molding the transparent synthetic resin panel in the state where the heated transparent synthetic resin panel is seated on a mold.

In another embodiment, an apparatus for vacuum-molding a transparent synthetic resin panel as broadly described herein may include a base part; a mold part protruding from the base part to manufacture the transparent synthetic resin panel in a specific shape; and an exhaust hole defined in an edge of the mold part.

In yet another embodiment, a door for a refrigerator as broadly described herein may include a door liner; an outer door manufactured by vacuum-molding, the outer door including a printed layer on an inner surface thereof and formed of a transparent material; and an insulation material disposed between the door liner and the outer door.

In still another embodiment, a door for a refrigerator is provided in which an insulation material is disposed in a space defined by an outer door and a door liner, wherein the outer door is manufactured by vacuum-molding a transparent synthetic resin panel.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A door, comprising.
    a door liner;
    an outer door coupled to the door liner;
    an insulation material provided between the door liner and the outer door; and
    a decorative panel provided on an outer surface of the outer door, the decorative panel having a front surface and a side surface that extends at a predetermined angle from the front surface, wherein the decorative panel is manufactured by vacuum-molding a transparent synthetic resin panel with a printed layer having a pattern, wherein the printed layer is attached to a rear surface of the transparent synthetic resin panel, wherein the front surface of the decorative panel comprises a planar section having a first pattern and a non-planar section having a second pattern and arranged continuously so as to form a three-dimensional contour, wherein a size and shape of the first pattern of the planar section are a same size and shape of the second pattern of the non-planar section after the vacuum-molding, and wherein the printed layer is positioned between the transparent synthetic resin panel and the outer door.

2. The door of claim 1, wherein at least a portion of the printed layer is elongated during the vacuum-molding.

3. A refrigerator comprising the door of claim 1.

4. The door of claim 1, wherein the pattern of the printed layer has a wave shape.

5. The door of claim 1, further comprising an upper cap provided at an upper portion of the outer door, and a lower cap provided at a lower portion of the outer door.

6. The door of claim 5, wherein the upper cap connects the upper portion of the outer door to the door liner, and wherein the lower cap connects the lower portion of the outer door to the door liner.

7. The door of claim 5, wherein the upper cap connects the decorative panel to the door liner, and wherein the lower cap connects the decorative panel to the door liner.

8. The door of claim 1, further comprising a gasket disposed on the door liner that prevents cool air from leaking.

9. A door, comprising:
an insulation material disposed in a space defined between an outer door and a door liner; and
a decorative panel mounted on an outer surface of the outer door, the decorative panel comprising a vacuum-molded transparent synthetic resin panel with a printed layer having a pattern, wherein the printed layer is attached to a rear surface of the transparent synthetic resin panel, wherein the decorative panel includes a front surface, a side surface, and a non-planar portion that connects the front surface to the side surface, wherein the front surface, the side surface, and the non-planar portion have a same pattern after the vacuum-molding, wherein the pattern of each of the front surface, the side surface and the non-planar portions have a same shape and size, and wherein the printed layer is positioned between the transparent synthetic resin panel and the outer door.

10. The door of claim 9, wherein the transparent synthetic resin panel comprises a casting poly methyl methacrylate (PMMA) sheet for molding.

11. The door of claim 9, further comprising a coating layer disposed on the transparent synthetic resin panel and providing a predetermined level of surface hardness.

12. The door of claim 11, wherein the coating layer comprises about 25 wt % to about 30 wt % of acrylate oligomer, about 15 wt % to about 20 wt % of polyester acrylate, about 15 wt % of urethane acrylate, about 10 wt % to about 15 wt % of polyester adhesion promoter, about 15 wt % of silica sol, and about 10 wt % of other components.

13. The door of claim 11, wherein the coating layer is disposed on a front surface of the transparent synthetic resin panel.

14. The door of claim 9, wherein the decorative panel is transparent such that the pattern of the printed layer is visible therethrough.

15. A home appliance comprising the door of claim 9.

* * * * *